Patented Feb. 12, 1924.

1,483,412

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

AMMONIA-SYNTHESIS CATALYST.

No Drawing. Application filed March 31, 1921. Serial No. 457,461.

*To all whom it may concern:*

Be it known that I, JOHN COLLINS CLANCY, a subject of the King of Great Britain, residing at Providence, in the county of Providence and State of Rhode Island, have invented certain new and useful Improvements in Ammonia-Synthesis Catalysts, of which the following is a specification.

This invention relates to the synthesis of ammonia from its elements through the instrumentality of a catalyst possessing certain novel and particularly valuable properties and characteristics. One object of the invention is the provision of a catalyst which may be readily and cheaply formed, and which possesses a high degree of efficiency by reason of a relatively large proportion of highly active catalytic material so supported as to expose a relatively large surface area to contact with the gases to be synthesized.

Another object of the invention relates to a novel method of conducting the ammonia synthesis process whereby the regeneration of spent portions of the catalyst is effected.

Other objects of the invention relating to novel combinations of steps in the process and materials employed as will be more fully set forth in the detailed description to follow.

I have discovered that ammonia synthesis may be readily effected by passing a mixture of nitrogen and hydrogen gases, in proper proportions for combining to form ammonia, into contact with a catalytic material prepared after the manner described below. In preparing my improved catalytic material I preferably employ a carbonate of an alkalinous metal such for example as barium, potassium or strontium and after mixing the same with carbon and a less basic metal, such as iron, manganese or cobalt, or suitable compound of the same, I first subject the material to a temperature of from 500° to 1200° C. in an atmosphere of nitrogen or a gas containing nitrogen as one of its elements or constituents.

The method of preparing the materials and effecting the mixture is somewhat similar to that described in United States Patent No. 1,120,682 granted to J. E. Bucher, December 15, 1914.

While I prefer to employ a carbonate of an alkalinous metal of which I have mentioned barium, potassium and strontium as among those which I regard as best adapted for the purpose, various carbonates and hydrates of alkali or alkali earth metals may be used to advantage.

The carbon employed may be in any desired form as for example charcoal, coke, activated carbon, etc., the ash content present in these substances being such as not to render the same objectionable for the purpose.

While it is preferable to employ as a catalytically active metal iron, manganese or chromium, other metals known as active catalytic agents may be used, or suitable oxids or carbonates of these metals.

In the preparation of the catalyst the metal or metal compound employed such as iron, iron carbonate or iron oxid is ground to a fine powder, preferably of sufficient fineness to pass through a sixty or one hundred mesh sieve, and is then thoroughly mixed with the carbon such as coke, charcoal or activated carbon and again passed through the grinding mill to reduce all parts of the mixture to a finely divided form and at the same time insure an intimate and uniform mixture of the materials. Substantially equal parts by weight of the metal and carbon may be employed, although the proportions are subject to variation with the particular metal used and also depending upon whether or not the metal is used in the form of an oxid. After the mixture of metal and carbon has been prepared as above described a suitable quantity of the alkalinous metal carbonate is added, and the resultant material thoroughly mixed together. For the purpose of illustration it will be assumed that barium carbonate is to be used, in which case the proportions of the various substances used may be as follows by weight: 80 parts iron, 20 parts carbon and 60 parts barium carbonate. When iron oxid or iron carbonate is substituted for the metallic iron the proportions of iron and carbon may be varied somewhat, and the proportion of iron may advantageously be increased by using 80 parts of iron, from 20 to 30 parts of carbon and from 40 to 60 parts of carbonate, if the carbonate employed is sufficiently effective as a binder to hold the increased proportion of iron against breaking down. The proportions of carbon and carbonate may also be varied somewhat as indicated above, dependent upon the nitrifying agent used.

The mixture of materials above described is then treated with water to form a dough like mass which is then immediately formed into briquets of suitable size and shape for use. The briquets may be readily formed by passing the mass through a power driven meat grinder having a plurality of openings of circular or angular form suitably arranged for forcing the material therethrough. The size of the openings is preferably such as to give briquets of approximately one-fourth inch in diameter, and means is provided for cutting the briquets into lengths of approximately one-half inch as the material emerges from the grinder.

The briquets should be dried quite rapidly by the application of heat, since if they are permitted to dry slowly, as at ordinary room temperature, the material is not sufficiently bound together to prevent disintegration. In the drying process the briquets may advantageously be placed over a steam coil or in a receptacle to which heat can be readily applied.

The finishing drying of the material may be effected in the same receptacle as the nitrifying operation is performed thus making it unnecessary to repeatedly handle the material, except that in such case the receptacle should be left open to the atmosphere during the finishing drying operation and be capable of being closed during the nitrifying of the mass.

After the material has been thoroughly dried it is activated by being subjected to the action of a nitrifying agent such as nitrogen gas, ammonia gas or a mixture of nitrogen and hydrogen gases, and the temperature is raised to from 500° to 1100° C., the degree of temperature being dependent upon the nitrifying agent employed as well as the pressure exerted upon the mass during the operation. When normal atmospheric pressure is employed the temperature of the mass is maintained at a higher degree than when the material is treated under higher pressures, while the effective treatment of the mass with nitrogen and hydrogen gas or nitrogen gas requires a higher temperature than when ammonia gas is employed. When using ammonia gas as a nitrifying agent under a pressure of from 15 to 100 atmospheres I prefer to effect the treatment of the mass at a temperature of from 500° to 700° C., while when using nitrogen gas or the nitrogen and hydrogen mixture at normal atmospheric pressure I may employ temperatures ranging from 800° to 1100° C.

This treatment is maintained for a sufficient period to effect the reduction of the carbonate or alkalinous metal salt to a carbonitrid compound, the exact composition of which is not clearly understood but which is probably in the nature of a cyanid or cyanamid of the corresponding alkalinous metal. The material after the completion of this treatment serves as a fair catalyst for ammonia synthesis but it is open to the objection that the material is highly densified owing to the high temperatures employed in its preparation and for this reason is not so readily permeated by the gases to be synthesized for bringing the gases into contact with all parts of the catalytically active material contained therein as is advisable to secure the best possible results.

When an oxid of a catalytically active metal is employed in forming the composition the reduction step serves to reduce the oxid so that the iron or other metal is deposited throughout the mass and exists in a very finely divided condition thus increasing the efficiency of the catalyst.

As previously stated, the nitrifying operation may be performed at atmospheric pressure but I prefer to employ a higher pressure during this operation, especially when nitrogen gas or ammonia gas is used as a nitrifying agent, and find that pressures of from 15 to 100 atmospheres are best adapted to be employed during this operation. The increased pressure, as indicated, allows the operation to be performed at a lower temperature than would otherwise be required, and thus prevents the extreme densification of the product which would result from the use of a higher temperature. The nitrifying operation is performed in an atmosphere of nitrogen or nitrogen bearing gas or ammonia gas, and oxygen should be excluded during this step in the preparation of the catalyst.

In order to perfect the catalyst and increase its efficiency I prefer to subject the same to further treatment after the completion of the nitrifying operation by soaking the prepared briquets in a bath of liquid anhydrous ammonia. The briquets may be transferred to the ammonia bath in any desired manner with an exclusion of oxygen and are permitted to remain in the ammonia bath for a sufficient length of time to allow the ammonia to thoroughly permeate the briquets. The ammonia apparently acts as a solvent for the cyanids and cyanamids of the alkalinous metal and upon evaporating off the ammonia the cyanids or cyanamids dissolved are probably deposited in the interstices of the briquets where they are readily accessible to the gases to be synthesized. The catalytic material is now ready for use as a catalyst and when a mixture of nitrogen and hydrogen gases, in proper proportions for the formation of ammonia, is passed thereover under suitable conditions of temperature and pressure a copious yield of ammonia is formed. The temperature and pressure used in the synthesis of ammonia from the catalyst thus formed may be varied somewhat depending upon the conditions of operation, but I prefer to employ temperatures of from 450° to 600° C., with pressures ranging from 50 to 100 atmospheres as giving the best results.

As previously stated, I find it preferable to employ a carbonate of an alkali or alkali earth metal in the formation of the catalyst although other oxygen bearing salts of such metals may be used, and I employ the term "alkalinous" metal carbonate to designate such salts throughout the specification and claims, it being understood that the term is used in its generic sense to designate such salts of alkali and alkali earth metals as may be specifically mentioned herein or may be regarded as equivalents thereof.

By the term carbon as used in the specification and claims I propose to include charcoal, coke and carbon which has been rendered catalytically active by treatment with gases after a manner known in the art. The terms metal, less basic metal and metal compounds found in the specification and claims are employed to designate catalytically active metals and compounds thereof such as iron, cobalt, manganese and equivalent elements.

During the nitrifying operation above described, the oxygen bearing salt of the alkalinous metal is evidently reduced by the carbon present to form a carbo-nitrid of such metal, which, apparently, is in the nature of a cyanid or cyanamid, and while the exact composition of the substance formed is not positively known I employ the term carbonitrid to indicate generally an alkalinous metal compound containing carbon and nitrogen whether such compound contains carbon and nitrogen in the form of a cyanogen radical or otherwise. It will be understood that the finely divided metal, metal oxide or metal carbonate employed, being thoroughly mixed with the alkalinous carbonate prior to the nitrifying operation, will be intimately associated with the carbonitrid formed during the reduction of the alkalinous metal salt, and if the metal employed is in the form of an oxid or carbonate the reducing step will result in depositing the metal in finely divided form in a manner to provide a large surface area of contact material for engagement by the gases to be synthesized. I have found that the catalyst formed as above described, as well as catalysts generally which are formed from or include a cyanid or cyanamid of an alkali or alkali earth metal, become spent or fatigued after having been used for a considerable period for effecting the operation of ammonia synthesis, thus reducing considerably their efficiency and making it necessary to renew the same at intervals.

Just what changes are produced in the catalysts to cause the lowering of their efficiency I am unable to state positively, but I am of the opinion that a reaction takes place between certain impurities in the gases to be synthesized, such as oxygen and water vapor, traces of which can only be removed with great difficulty, whereby a portion of the cyanid, or cyanamid in the catalyst is changed to a carbonate, thus decreasing the quantity of active material in the catalyst. I have found that the catalyst formed in the manner above described may be regenerated when portions thereof have become spent or fatigued by reacting thereupon with dry ammonia gas preferably under pressure and at an elevated temperature. While the temperature and pressure employed in the regeneration of the catalyst may vary considerably I have found that with temperatures of from 450° to 600° C., and pressures of from 50 to 100 atmospheres excellent results may be obtained. The treatment with dry ammonia gas for regenerating the catalyst may be accomplished by cutting off the supply of gases to be synthesized from the ammonia synthesis apparatus and passing therethrough a current of dry ammonia gas under pressure, the autoclave containing the catalyst being maintained at a temperature to best facilitate the regeneration of the catalyst. As an alternative method of effecting the regeneration of the catalyst, a portion of the ammonia formed during the synthetic operation may be returned to the system for supplying gases to be synthesized together with the residue of uncombined nitrogen and hydrogen gases, and caused to again pass into contact with the catalyst, the ammonia present in the gas mixture thus serving to continually act upon the spent portions of the catalyst to regenerate the same during the continuance of the synthetic operation.

While I have described with considerable particularity the various steps in the above process as well as the materials to be employed in order that the same may be clear to those skilled in the art, it is to be understood that I do not desire or intend to be limited to the precise details of operation, or the specific substances indicated as preferred, except as such may be specifically recited in the following claims.

Having described my invention what I claim is:

1. The process of producing a catalyst for ammonia synthesis, which comprises heating an alkalinous metal oxygen bearing salt in the presence of a catalytically active metal, carbon and a gas containing nitrogen.

2. The process of producing a catalyst for ammonia synthesis, which comprises, heating an alkalinous metal carbonate in the presence of iron, carbon and a gas containing nitrogen.

3. The process of producing a catalyst for ammonia synthesis, which comprises, heating an alkalinous metal oxygen bearing salt in the presence of a catalytically active metal, carbon and ammonia gas.

4. The process of producing a catalyst for ammonia synthesis, which comprises, heating an alkalinous metal carbonate in the presence of iron, carbon and ammonia gas.

5. The process of producing a catalyst for ammonia synthesis, which comprises, heating an alkalinous metal oxygen bearing salt in the presence of a catalytically active metal, carbon and a gas containing nitrogen while maintaining the materials under super-atmospheric pressure.

6. The process of producing a catalyst for ammonia synthesis, which comprises, first heating an alkalinous metal carbonate in the presence of a catalytically active metal and carbon, and then reacting upon the resultant mass with a gas containing nitrogen under pressure and at an elevated temperature.

7. The process of producing a catalyst for ammonia synthesis, which comprises, heating an alkalinous metal oxygen bearing salt in the presence of a catalytically active metal, carbon and ammonia gas while maintaining the materials under super-atmospheric pressure.

8. The process of producing a catalyst for ammonia synthesis, which comprises, first heating an alkalinous metal salt in the presence of a catalytically active metal and carbon, and then reacting upon the resultant mass with ammonia gas under pressure and at an elevated temperature.

9. The process of producing an ammonia synthesis catalyst, which comprises, the heating under pressure of an alkalinous metal salt in the presence of a catalytically active metal compound, carbon and a gas containing nitrogen.

10. The process of producing an ammonia synthesis catalyst, which comprises, the heating under pressure of an alkalinous metal salt in the presence of a catalytically active metal compound, carbon and dry ammonia gas.

11. The process of producing an ammonia synthesis catalyst, which comprises, heating an alkalinous metal oxygen bearing salt in the presence of a catalytically active metal, carbon and a gas containing nitrogen, treating the resultant material with liquid anhydrous ammonia, and evaporating off the ammonia.

12. The process of producing an ammonia synthesis catalyst, which comprises, heating an alkalinous metal oxygen bearing salt in the presence of a catalytically active metal, carbon and dry ammonia gas, treating the resultant material with liquid anhydrous ammonia and evaporating off the ammonia.

13. The process of producing an ammonia synthesis catalyst. which comprises, heating an alkalinous metal oxygen bearing salt in the presence of a catalytically active metal, carbon and a gas containing nitrogen under a pressure in excess of that normally exerted by the atmosphere, treating the resultant material with liquid anhydrous ammonia, and evaporating off the ammonia.

14. The process of producing an ammonia synthesis catalyst, which comprises, heating an alkalinous metal oxygen bearing salt in the presence of a catalytically active metal, carbon and ammonia gas under a pressure in excess of that normally exerted by the atmosphere, treating the resultant material with liquid anhydrous ammonia, and evaporating off the ammonia.

15. A catalyst for ammonia synthesis which comprises a carbo-nitrid reduction compound of an alkalinous metal intimately associated with finely divided iron.

16. A catalyst for ammonia synthesis which comprises a carbo-nitrid reduction compound of an alkalinous metal intimately associated with a catalytically active metal, the resultant mass having been activated by treatment with ammonia gas at an elevated temperature.

17. The process of ammonia synthesis, which comprises, synthesizing said ammonia from its elements through the intermediacy of a catalyst containing a carbo-nitrid compound of an alkalinous metal formed by the reduction of a carbonate of said metal intimately associated with a catalytically active metal, and regenerating the catalyst by passing thereover ammonia gas mingled with the gases to be synthesized.

18. The process of producing ammonia, which comprises, synthesizing said ammonia from its elements through the intermediacy of a catalyst containing a carbo-nitrid compound of an alkalinous metal formed by the reduction of a carbonate of said metal, in the presence of a catalytically active metal and the regenerating of said catalyst simultaneously with the synthesizing operation by passing thereover dry ammonia gas mingled with the gases to be synthesized under pressure and at an elevated temperature.

19. The process of producing ammonia, which comprises, synthesizing said ammonia from its elements through the intermediacy of a catalyst comprising a product resulting from the heating of an alkalinous metal carbonate in the presence of a catalytically active metal carbon and a gas containing nitrogen, and regenerating said catalyst by passing thereover ammonia gas mingled with the gases to be synthesized.

20. The process of producing ammonia, which comprises, synthesizing said ammonia from its elements through the intermediacy of a catalyst comprising a product resulting from the heating of an alkalinous metal carbonate in the presence of a catalytically active metal carbon and a gas containing nitrogen, and regenerating said catalyst with dry ammonia gas simultaneously with the effectuation of the synthesizing operation.

21. A catalyst for ammonia synthesis resulting from forming a carbo-nitrid material by reducing an alkalinous metal salt in the presence of a catalytically active metal and a nitrogen bearing gas, and subsequently treating said material with liquid anhydrous ammonia.

22. A catalyst for ammonia synthesis resulting from forming a carbo-nitrid of an alkalinous metal intimately associated with a catalytically active metal, and treating the substance thus formed with liquid anhydrous ammonia.

23. A catalyst for ammonia synthesis formed by heating an alkalinous metal salt with a catalytically active metal in the presence of a reducing agent and a gas containing nitrogen, and treating the substance thus formed with liquid anhydrous ammonia.

24. A catalyst for ammonia synthesis formed by heating an alkalinous metal carbonate with a catalytically active metal in the presence of a reducing agent and a gas containing nitrogen, and treating the substance thus formed with liquid anhydrous ammonia.

25. A catalyst for ammonia synthesis formed by heating an oxygen salt of an alkalinous metal with a catalytically active metal in the presence of carbon and nitrogen, and treating the material thus obtained with liquid anhydrous ammonia.

26. A catalyst for ammonia synthesis formed by reducing an oxygen salt of an alkalinous metal in the presence of a catalytically active metal and nitrogen, and treating the substance thus formed with liquid anhydrous ammonia.

27. The process of forming an ammonia synthesis catalyst, which comprises; intimately mixing together quantities of an alkalinous metal carbonate, a catalytically active metal in finely divided form, and carbon; forming the mass into briquets; rapidly drying said briquets; subjecting the said briquets to heat in the presence of a nitrogen bearing gas; and then treating the briquets with liquid anhydrous ammonia.

28. A catalyst for ammonia synthesis formed by heating, under pressure, an alkalinous metal salt with a catalytically active metal compound in the presence of a reducing agent and a gas containing nitrogen, and treating the substance thus formed with liquid anhydrous ammonia.

29. A catalyst for ammonia synthesis formed by heating an alkalinous metal salt with a catalytically active metal in the presence of a reducing agent and a gas containing nitrogen to a temperature of approximately 600° C. under high pressure.

In testimony whereof I have affixed my signature.

JOHN COLLINS CLANCY.